(12) United States Patent
Modrzyk et al.

(10) Patent No.: US 10,394,522 B2
(45) Date of Patent: *Aug. 27, 2019

(54) DISPLAY CONTROLLER

(71) Applicant: ARM Limited, Cambridge (GB)

(72) Inventors: Damian Piotr Modrzyk, Katowice (PL); David Brown, Fulbourn (GB); Ozgur Ozkurt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,456

(22) Filed: Jul. 18, 2017

(65) Prior Publication Data

US 2019/0026243 A1    Jan. 24, 2019

(51) Int. Cl.
| G06T 1/60 | (2006.01) |
| G06F 5/06 | (2006.01) |
| G06F 13/38 | (2006.01) |
| G09G 5/00 | (2006.01) |

(52) U.S. Cl.
CPC ............ *G06F 5/065* (2013.01); *G06F 13/385* (2013.01); *G09G 5/00* (2013.01); *G06F 2205/067* (2013.01); *G06T 1/60* (2013.01)

(58) Field of Classification Search
None
See application file for complete search history.

(56) References Cited

U.S. PATENT DOCUMENTS

| 2006/0066506 A1* | 3/2006 | Nojiri | G06F 3/1431 |
| | | | 345/3.1 |
| 2010/0013840 A1* | 1/2010 | Hunkins | G06F 3/14 |
| | | | 345/502 |
| 2015/0356953 A1 | 12/2015 | Modryzk | |
| 2017/0140500 A1 | 5/2017 | Croxford | |
| 2017/0140736 A1 | 5/2017 | Croxford | |

FOREIGN PATENT DOCUMENTS

GB          2544333          5/2017

* cited by examiner

*Primary Examiner* — Yanna Wu
(74) *Attorney, Agent, or Firm* — Vierra Magen Marcus LLP

(57) ABSTRACT

A display controller for a data processing system comprises two sets of display processing units, each set of display processing units comprising an input unit operable to read at least one input surface, a processing unit operable to process one or more input surfaces to generate an output surface, and an output unit operable to provide an output surface for display to a display. The display controller also includes internal data path via which pixel data of a surface may be passed between the sets of display processing units, and a control unit that can selectively activate one or both of the sets of display processing units to process one or more input surfaces to generate one or more output surfaces for display.

20 Claims, 7 Drawing Sheets

DISPLAY CONTROLLER

BACKGROUND

The technology described herein relates to display controllers for data processing systems.

In data processing systems, an image that is to be displayed to a user is typically processed by a so-called "display controller" of the data processing system for display.

Typically, the display controller will read an image or images to be displayed from a so-called "frame buffer" in memory which stores the image(s) as a data array (e.g. by internal direct memory access (DMA)) and provide the image data appropriately to the display (e.g. via a pixel pipeline) (which display may, e.g., be a screen or printer). The image or images to be displayed are is stored in the frame buffer in memory, e.g. by a graphics processor, when they are ready for display, and the display controller will then read the frame buffer and provide the output image to the display for display.

The display controller processes the image(s) from the frame buffer(s) to allow it to be displayed on the display. This processing includes appropriate display timing functionality (e.g. it is configured to send pixel data to the display with appropriate horizontal and vertical blanking periods), to allow the image(s) to be displayed on the display correctly.

The Applicants believe that there remains scope for improvements to display controllers for data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
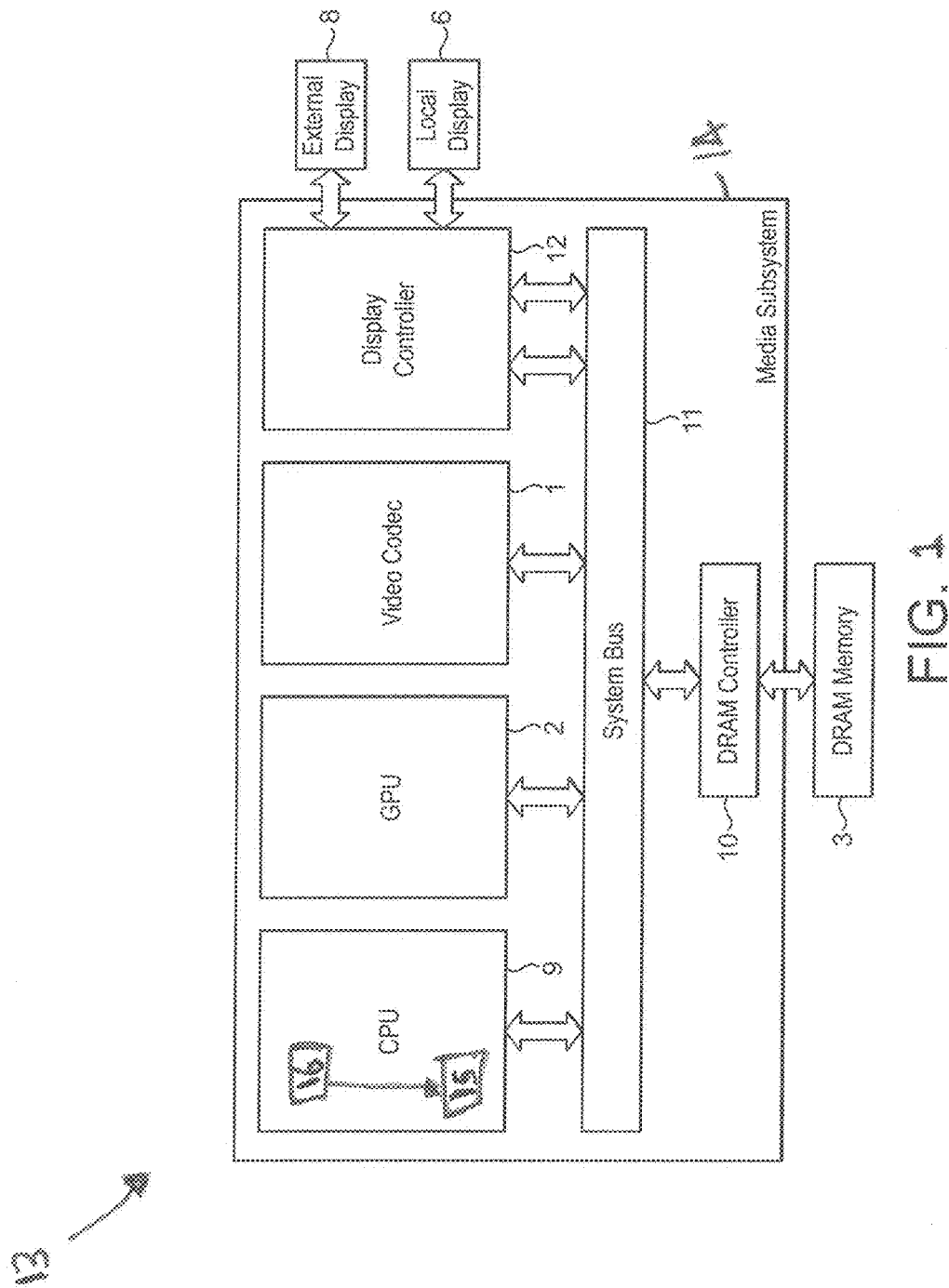
FIG. 1 shows a data processing system in accordance with an embodiment of the technology described herein.

An embodiment of the technology described herein comprises a display controller for a data processing system, the display controller comprising:

a first set of display processing units comprising a first input unit operable to read at least one input surface, a first processing unit operable to process one or more input surfaces to generate an output surface, and a first output unit operable to provide an output surface for display to a first display;

a second set of display processing units comprising a second input unit operable to read at least one input surface, a second processing unit operable to process one or more input surfaces to generate an output surface, and a second output unit operable to provide an output surface for display to a second display;

one or more internal data paths via which pixel data of a surface may be passed between the first and second sets of display processing units; and a control unit comprising control circuitry operable to, in response to control signals received by the control unit, selectively activate one or more of the first and second sets of display processing units to process one or more input surfaces to generate one or more output surfaces for display.

Another embodiment of the technology described herein comprises a method of operating a display controller in a data processing system, the display controller comprising:

a first set of display processing units comprising a first input unit operable to read at least one input surface, a first processing unit operable to process one or more input surfaces to generate an output surface, and a first output unit operable to provide an output surface for display to a first display;

a second set of display processing units comprising a second input unit operable to read at least one input surface, a second processing unit operable to process one or more input surfaces to generate an output surface, and a second output unit operable to provide an output surface for display to a second display;

one or more internal data paths via which pixel data of a surface may be passed between the first and second sets of display processing units; and a control unit comprising control circuitry operable to, in response to control signals received by the control unit, selectively activate one or more of the first and second sets of display processing units to process one or more input surfaces to generate one or more output surfaces for display;

the method comprising:

the control unit, in response to a control signal received by the control unit, selectively activating one or more of the first and second sets of display processing units to process one or more input surfaces to generate one or more output surfaces for display; and the activated one or more of the first and second sets of display processing units processing one or more input surfaces to generate one or more output surfaces for display.

The technology described herein relates to a display controller that comprises (at least) a first set of display processing units and a second set of display processing units. Each of the first and second set of display processing units of the display controller includes an input unit configured to read in at least one input surface (layer) and an output unit configured to provide an output surface (frame) for display to a display.

Each of the first and second set of display processing units of the display controller of the technology described herein further comprises a processing unit configured to process an input surface or surfaces to provide an output surface.

Thus, the display controller of the technology described herein comprises first and second sets of display processing units that can (e.g. independently) generate (e.g. respective) output surfaces. Thus, the display controller of the technology described herein can be (and in an embodiment is) used to provide processed (e.g. composited) output surfaces for display to one or plural (e.g. two) displays.

The display controller of the technology described herein further comprises a control unit that is operable to selectively activate one or both of the first and second sets of display processing units to process one or more input surfaces to generate one or more output surfaces for display. Thus, the control unit can, for example (and in embodiments does), activate either the first set of display processing units, or the second set of display processing units, or both the first and second sets of display processing units, to process one or more input surfaces to generate one or more output surfaces for display, e.g., and in an embodiment, in response to control signals sent by, e.g., a host processor of the data processing system that the display controller is part of. This accordingly allows the respective sets of display processing units of the display controller to be flexibly activated and configured to generate an output surface or surfaces for display under the control of, e.g., an application that requires the display of images.

The display controller of the technology described herein further comprises one or more internal data paths for passing pixel data between the first and second sets of display processing units. As will be discussed further below, this facilitates a greater degree of control and flexibility in the types of operation that can be carried out by the display controller. For example, the second set of display processing units may perform processing operations on behalf of, or in combination with, the first set of display processing units (or vice-versa).

The first and second sets of display processing units, control unit, etc., are (in an embodiment) all part of the same (display) processing core of the display controller. Thus they will, for example, be provided as or on the same chip (monolithic integrated circuit).

The first and second sets of display processing units (in an embodiment) share the same processing core resources, such as, and in an embodiment, one or more of, and in an embodiment all of: timing circuitry (an internal clock); reset circuitry (a reset input); a software programming interface; a software interrupt service; a (shared) control interface, etc.

Correspondingly, the, e.g., host processor, that is to use the display controller may and in an embodiment does execute a single driver that controls the display controller. Thus, the different sets of display processing units are in an embodiment controllable, and controlled, by the same (single) driver, e.g. executing on a host processor.

Thus the respective first and second sets of display processing units will share control resources of and for the display controller (will have control resources in common), such as, and in an embodiment, one or more of, and in an embodiment all of: the control unit, timing circuitry (clock), driver, reset, interrupt, etc. (e.g. as discussed above). In an embodiment, the first and second sets of display processing units at least share the control unit and a (single) shared clock.

The control unit should be, and is in an embodiment, operable to active (and deactivate) the sets of display processing units (and re-configure the operation of the sets of display processing units) without the need to switch off (reset) the display controller and controlled display(s). This is facilitated by the sets of display processing units sharing the appropriate control resources, such as a clock, and allows dynamic re-configuration of the (active) display controller resources in use. The control unit is in an embodiment operable as (and acts as) a single mode control finite state machine (FSM).

This all facilitates the dynamic reconfiguration and flexible operation of the display controller of the technology described herein in use, as compared, for example, to display control arrangements that may have multiple processing cores (that each, accordingly, may have their own respective clocks that accordingly would need to be synchronised or reset when the different display processing cores are to be reconfigured or operated in combination). The technology described herein avoids this by implementing the plural sets of display processing units as part of the same, single, system, such that they share (use in common) control resources such as the clock, etc., thereby reducing or avoiding issues such as timing control when reconfiguring the operation of the respective sets of display processing units in use.

The technology described herein can accordingly allow, for example, the operating mode of the display controller to be more readily reconfigured dynamically in use, in contrast to, for example, arrangements which include plural display controllers and/or that use plural display processing cores.

This also facilitates, for example, the transfer of data between the respective sets of display processing units via the internal data path or paths of the display controller, as again because the first and second sets of display processing units are under the control of, for example, the same internal clock, such data transfer between the respective sets of display processing units can be more readily achieved and reconfigured in use.

It will be appreciated, therefore, that the technology described herein provides an improved display controller.

The display controller includes at least a first set and a second set of display processing units. The first set of display processing units is in an embodiment the "primary" set of display processing units, e.g. for controlling the data processing system's (the device's) local (integrated) display (e.g. screen or panel), and the second set of display processing units is in an embodiment the "secondary" set of display processing units, e.g. for controlling an external display. However, it would also be possible for the first set of display processing units to be the secondary (external) set of display processing units and the second set of display processing units to be the primary (local) set of display processing units.

It would also be possible for the display controller to comprise one or more further sets of display processing units (and in an embodiment, this is the case), e.g. to have three or four sets of display processing units in total.

One or more (or each) of the further sets of display processing units may be configured in a corresponding manner to the first and/or second sets of display processing units (and thus comprise, for example, a respective input unit, processing unit and output unit). This would then allow the display controller to support more than two displays, for example.

In one embodiment, one or more (or each) of the further sets of display processing units in addition to the first and second sets of display processing units do not include an output unit, and instead comprise only an input unit and a processing unit. In this case, such additional sets of display processing units will not be operable to provide outputs directly to a display, but may be operated to provide, as will be discussed further below, supplemental processing, e.g. of a surface or surfaces to be displayed, to support processing by other (e.g. the first and/or second) sets of display processing units.

Where the display controller includes further sets of display processing units, then those further sets of display processing units will (and in an embodiment do) accordingly correspondingly share the common control resources, etc., of the display controller with the first and second sets of display processing units. Correspondingly, the display controller in an embodiment comprises one or more internal data paths via which pixel data for a surface may be passed from and/or to the additional sets of display processing units to and/or from one or more other of the sets of display processing units of the display controller.

In an embodiment, each set of display processing units is connected to at least one other set of display processing units of the display controller via an internal data path or paths via which pixel data may be passed to and/or from the set of display processing units to the another set of display processing units.

One or more sets of display processing units may be connected by internal data paths to two, or more than two, other sets of display processing units, if desired. In an embodiment, a set of display processing units is connected via an internal data path or paths to at least one, but no more than two, other sets of display processing units of the processing core of the display controller.

Correspondingly, the control unit is in an embodiment operable to selectively activate the additional set or sets of display processing units (in response to control signals received by the control unit), i.e., such that the control unit can selectively activate any of the sets of display processing units of the display controller either individually or in combination. This facilitates the flexible and efficient use of the different sets of display processing units that are provided.

Indeed, it is an advantage of the arrangement of the technology described herein of implementing plural sets of display processing units that share the control resources of the display controller that it facilitates the ability to flexibly scale a display controller, for example in terms of the number of input surfaces it can process and/or output surfaces that it can produce, e.g. for display, e.g. by including more or less sets of display processing units, and without the need to provide substantial additional control resources when increasing the number of sets of display processing units that are provided.

Each input unit of a set of display processing units may comprise any suitable such unit configured to read at least one input surface. In an embodiment, one or each input unit comprises a memory read sub-system comprising, e.g., and in an embodiment, a read controller, such as for example a Direct Memory Access (DMA) read controller, in an embodiment together with a translation lookaside buffer (TLB), etc.

In an embodiment, at least one or each of the input units (read controllers) is configured to read at least one input surface from a memory in which the at least one input surface is stored. The memory may comprise any suitable memory and may be configured in any suitable and desired manner. For example, it may be a memory that is on-chip with the display controller or it may be an external memory. In an embodiment it is an external memory, such as a main memory of the overall data processing system. It may be dedicated memory for this purpose or it may be part of a memory that is used for other data as well. In an embodiment at least one or each input surface is stored in (and read from) a frame buffer.

Each input surface read by a set of display processing units (input unit) may be any suitable and desired such surface. In one embodiment, at least one or each input surface is an image, e.g. frame, e.g., and in an embodiment, for display.

The input surface or surfaces can be generated as desired. For example one or more input surfaces may be generated by being appropriately rendered and stored into a memory (e.g. frame buffer) by a graphics processing system (a graphics processor). Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a graphical user interface (GUI), a GUI with video data (e.g. a video frame with graphics "play back" and "pause" icons), etc.

There may only be one input surface that is read by a set of display processing units (and processed to generate an output surface), but in an embodiment there are plural (two or more) input surfaces that are read by a set of display processing units (and processed to generate an output surface). All the sets of display processing units that are active may process the same input surface(s), may process completely different input surfaces, or may have only some but not all of their input surfaces in common.

In an embodiment at least one, and in an embodiment each, of the input units further comprises one or more latency hiding buffers, e.g. in the form of one or more FIFO (first-in-first-out) stages, e.g. for buffering the input surfaces read by the input unit, or otherwise, as appropriate.

At least one or each of the input units in an embodiment further comprise one or more layer pipelines configured to perform one or more processing operations on one or more input surfaces, as appropriate, e.g. before providing the one or more processed input surfaces to the corresponding processing unit, or otherwise. At least one or each of the input units may comprise plural layer pipelines, such as two, three or more layer pipelines. One or more of the layer pipelines may comprise a video layer pipeline and/or one or more of the layer pipelines may comprise a graphics layer pipeline. Each of the one or more layer pipelines may be operable, for example, to provide pixel processing functions such as pixel unpacking, colour conversion, (inverse) gamma correction, and the like.

In an embodiment, at least one or each input unit also or instead, and in an embodiment also, comprises a decoding stage configured to decode (e.g. decompress) one or more surfaces, in an embodiment one or more of the input surfaces, e.g. to generate one or more decoded (e.g. decompressed) input surfaces. This is particularly useful in embodiments where one or more of the input surfaces is stored in an encoded (e.g. compressed) form. For example, one or more of the input surfaces may have been subjected to compression, such as for example, ARM Frame Buffer Compression (AFBC) (as described in US-A1-2013/0034309) prior to being stored in memory. Thus, in one embodiment, at least one or each decoding stage may comprise an AFBC decoder for decoding one or more input surfaces.

The input unit of a given set of display processing units should, and is in an embodiment configured to, provide the input surface(s) that it reads to the corresponding processing unit of its set of display processing units for processing to generate an output surface.

Each output surface generated by a (processing unit of a) set of display processing units may be any suitable and desired such surface. In an embodiment each output surface that is generated by a set of display processing units is at least one output window, and in an embodiment an image, e.g. frame, for display. An output surface that is generated by a set of display processing units (its processing unit) may be a "final" output surface for display (on a display), or an "intermediate" output surface to be passed to another set of display processing units (for further processing). As will be discussed further below, in embodiments, each output surface is composited from plural input surfaces (although this need not be the case).

In one embodiment, the first set of display processing units generates a single output surface. In this embodiment, the single output surface generated by the first set of display processing units is in an embodiment the output surface for display (i.e. the output surface for display displayed on the first display). Alternatively, the first set of display processing units may generate plural output surfaces.

In one embodiment, the second set of display processing units generates a single output surface. In this embodiment, the single output surface generated by the second set of display processing units may be an output surface for display (i.e. the output surface for display displayed on the second display) and/or an output surface for which pixel data is passed to the first set of display processing units. It would also be possible for the second set of display processing units to generate plural, in an embodiment two, output surfaces (which may be the same or different). In this embodiment, one of the output surfaces may be an output surface for display (i.e. the output surface for display displayed on the second display) and another of the output surfaces may be an output surface for which pixel data is passed to the first set of display processing units.

Each processing unit may be configured to process at least one input surface to generate an output surface in any desired manner.

The surfaces that are processed by a processing unit of a set of display processing units may comprise one or more input surfaces that have been read by the input unit of the set of display processing units and/or one or more modified versions of input surfaces read by the input unit of the set of display processing units (e.g. one or more decoded, decompressed, rotated, and/or scaled input surfaces). The surfaces that are processed by a processing unit of a set of processing units may also comprise a surface or surfaces for which pixel data is passed from another set of display processing units to the set of display processing units in question via an internal data path of the display controller (and/or a modified version of such surfaces).

In one embodiment, at least one, and in an embodiment each, processing unit comprises a composition stage (subsystem) configured to compose (two or more) surfaces to generate a composited surface. Each composition stage may be configured to compose surfaces to generate a composited surface in any suitable manner as desired. In an embodiment, at least one or each composition stage is configured to blend the surfaces to generate a composited surface.

At least one or each composited surface may be a or the "final" output surface generated by the processing unit in question, and/or at least one or each composited surface may be subjected to further processing in order to generate a or the output surface.

The input surfaces and the composited/output surface(s) may have the same or different sizes, resolutions, etc.

In an embodiment, at least one, and in an embodiment each, processing unit also or instead, and in an embodiment also, comprises a rotation stage configured to rotate one or more surfaces, in an embodiment one or more of the input surfaces, e.g. to generate one or more rotated input surfaces. This is particularly useful where, for example, it is necessary and/or desired to rotate one or more of the input surfaces (windows), e.g. prior to compositing or otherwise.

In an embodiment, at least one, and in an embodiment each, processing unit also or instead, and in an embodiment also, comprises one or more scaling stages or engines configured to scale (e.g. upscale and/or downscale) one or more surfaces, e.g. to generate one or more scaled surfaces. Each scaling stage may be configured to scale any one, some, or all of the (optionally modified) input surfaces, a composited surface, and/or an (the) output surface.

In an embodiment, at least one or each of the one or more scaling stages are configured to scale one or more of the input surfaces, e.g. so as to generate one or more scaled input surfaces. This is particularly useful where, for example, it is desired to scale one or more of the input surfaces, e.g. prior to composition, prior to passing to another set of display processing units, or otherwise.

Additionally or alternatively, at least one or each of the one or more scaling stages may be configured to scale an output surface, e.g. to generate a scaled composited output surface. This is particularly useful where, for example, it is desired to scale an output surface, e.g. prior to displaying it, or otherwise.

In another embodiment, at least one, and in an embodiment each, processing unit also or instead, and in an embodiment also, comprises a compression stage configured to compress one or more surfaces, e.g. to generate one or more compressed surfaces. Each compression stage may be configured to compress any one, some, or all of the input surface(s), a composited surface, and/or an output surface.

As will be appreciated from the above, the processing unit of a set of display processing units in an embodiment comprises a plurality of processing stages or elements, and in an embodiment comprises one or more of, and in an embodiment all of: a composition stage (engine), a scaling stage (engine), a rotation stage (engine), and a compression stage (engine). Correspondingly, the processing of the at least one input surface to generate an output surface in an embodiment comprises one or more of and in an embodiment all of: rotation, composition, scaling, and optionally compression.

The output unit of a set of display processing units of the display controller of the technology described herein may be any suitable such output unit configured to provide an output surface for display to a display, e.g. to cause an output surface for display to be displayed on the display (to act as a display interface). Each output unit in an embodiment comprises appropriate timing control functionality for the display (e.g. it is configured to send pixel data to a display with appropriate horizontal and vertical blanking periods).

In an embodiment, at least one, and in an embodiment each, output unit also comprises one or more "post-processing" stages, e.g. in the form of a post-processing pipeline, configured to selectively perform one or more processing operations on an output surface, e.g. to generate a post-processed output surface. At least one or each of the one or more post-processing stages may comprise, for example, a colour conversion stage configured to carry out colour conversion on a surface, a dithering stage configured to carry out dithering on a surface, and/or a gamma correction stage configured to carry out gamma correction on a surface.

Each output unit should, and is in an embodiment configured to, receive an output surface for display (before providing it to the display) directly from within the internal set(s) of processing units of the display controller.

In an embodiment, a, and in an embodiment each, output unit can, and is configured to be able to, receive an output surface for display, in an embodiment directly, from the processing unit of the set of display processing units that the output unit belongs to.

In an embodiment, a, and in an embodiment each, output unit can also, and is configured to be able to, as will be discussed further below, receive an output surface for display, in an embodiment directly, from another (e.g. at least one other, such as two other) set of display processing units of the display controller, in an embodiment via an internal data path connecting the output unit and the another set(s) of display processing units.

In an embodiment, at least one or each set of display processing units further comprises a write-out stage configured to write a, e.g. output, surface to external memory. This write-out stage may be provided as part of the input unit, processing unit, and/or output unit of the set of display processing units in question. The write-out stage means that a set of display processing units can be operated, e.g., to selectively write out an output surface to external memory (such as a frame buffer), e.g. at the same time as an output surface is displayed on the display. This can again facilitate a greater degree of control and flexibility in the types of operation that can be carried out by the display controller.

A write-out stage may be any suitable such stage that can write an output surface to external memory. In one embodiment, at least one or each write-out stage comprises a write controller, such as a Direct Memory Access (DMA) write controller.

In these embodiments, the external memory should be and is in an embodiment one or more memories external to the display controller, to which the or each write-out stage can write data, such as a frame buffer. The external memory is in an embodiment provided as or on a separate chip (monolithic integrated circuit) to the display controller. The external memory in an embodiment comprises a main memory (e.g. that is shared with the central processing unit (CPU)), e.g. a frame buffer, of the overall data processing system.

In an embodiment, the control unit, in an embodiment in response to received control signals, is operable to selectively cause one or more of the sets of display processing units to write a surface to external memory (can selectively configure one or more of the sets of display processing units to write a surface to external memory in use).

The display controller of the technology described herein further includes one or more internal data paths via which pixel data for a surface may be passed between different (e.g. the first and second) sets of display processing units. There may only be a single internal data path, or there may be, and in an embodiment is, plural internal data paths.

The internal data path or paths may be configured to allow pixel data to be passed from one set of display processing units to another in one direction only, but in an embodiment, an internal data path or paths are provided to allow pixel data to be passed both from one set of display processing units to another set of display processing units and vice-versa (e.g. both to the first set of display processing units from the second set of display processing units and from the first set of display processing units to the second set of display processing units).

In the case where the display controller includes more than two sets of display processing units, then there are in an embodiment internal data paths for passing pixel data for a surface between more than two of the sets of display processing units.

In the case where there are three or more sets of display processing units, then internal data paths could be configured to allow pixel data for a surface to be passed from a given set of display processing units to each of the other sets of display processing units (and, in an embodiment, vice-versa). In one embodiment, this is what is done.

In another embodiment, the internal data paths of the display controller are arranged such that the respective sets of display processing units are, in effect, connected in series (in a (linear) daisy chain (cascade) arrangement) by the internal data paths. In this case therefore, a given set of display processing units will have an internal data path or paths allowing it to send and/or receive pixel data for a surface to and/or from (in an embodiment only) its adjacent set or sets of display processing units in the sequence of sets of display processing units of the display controller.

Thus, for example, and in an embodiment, the first set of display processing units will have an internal data path facilitating communication of pixel data for a surface with the second set of display processing units of the display controller, the second set of display processing units will then have (in an embodiment only), as well as the internal data path(s) communicating with the first set of display processing units, a second set of internal data path or paths providing communication with a third set of display processing units (if present) of the display controller, and the third set of display processing units (if present) will then have (in an embodiment only), as well as the internal data path(s) communicating with the second set of display processing units, a further set of internal data path or paths providing communication with a fourth set of display processing units (if present) of the display controller, and so on.

It will be appreciated in this regard, that in general "adjacent" sets (pairs) of display processing units will be connected by one or more internal data paths to allow those sets of display processing units to communicate pixel data of a surface to each other. Correspondingly, there will be (plural) different internal data paths within the display controller that are each able to communicate pixel data of respective (and different) surfaces from one set of display processing units to another.

A (and each) internal data path for passing pixel data of a surface from one set of display processing units to another set of display processing units may comprise any suitable such data path. The internal data path should be (and in an embodiment is) internal to the chip (monolithic integrated circuit) as or on which the processing core of the display controller is provided. Thus, a set of display processing units is able to receive surface data from another set of display processing units directly from within the display controller via the internal data path in question, i.e. without the surface being output from the display controller or being stored in external memory.

The pixel data that is internally passed from one set of display processing units to another set of display processing units should be (and in an embodiment is) RGB pixel data. The pixel data is in an embodiment passed from one set of display processing units to the other together with synchronisation (timing) signals as appropriate.

A surface for which pixel data is passed from one set of display processing units to another set of display processing units via an internal data path may be any suitable and desired surface. This may depend, for example, upon which parts of the sets of display processing units the internal data path connects (allows surface pixel data to be transferred between).

An internal data path between two sets of display processing units can connect the two sets of display processing units at any suitable and desired position.

In one embodiment, a respective pair of sets of display processing units that are connected to each other via an internal data path are connected via an internal data path that connects the processing units of the respective sets of display processing units. Thus, in an embodiment, an internal data path connects the processing unit of the first set of display processing units to the processing unit of the second set of display processing units.

In an arrangement, each set of display processing units that is connected to another set of display processing units by an internal data path is connected to the other set or sets of display processing units that it is connected to via respective internal data paths connecting the processing units of the respective sets of display processing units. In such an arrangement, there will be internal data paths connecting the processing units of each pair of sets of display processing units that are connected to each other via an internal data path.

In an embodiment, the internal data path between processing units of respective sets of display processing units is connected between (interfaced with) the composition stages of the two sets of display processing units that it connects, i.e. such the pixel data of a surface can be (directly) passed from the composition stage of one of the sets of display processing units to the composition stage of the other of the sets of display processing units via the internal data path. The overall effect of this is that one processing unit (composition stage) can (and in an embodiment does) process (e.g. compose) a surface that is received from the other set of display processing units without firstly having to perform any other processing operations. This represents a particularly convenient and efficient arrangement, e.g. where it is desired to utilise two sets of display processing units for processing (e.g. composition) to generate an output surface.

In an embodiment, an internal data path also or instead (and in an embodiment also) connects the output unit of one set of display processing units with the output unit of another set of display processing units. In other words, there will also or instead, and in an embodiment also, be an internal data path or paths that (directly) communicate surface pixel data between output units of respective sets of display processing units of the display controller.

Thus, in an embodiment a respective pair of sets of display processing units that are connected to each other via an internal data path are connected via an internal data path that connects the output units of the respective sets of display processing units. In an arrangement, each set of display processing units that includes an output unit and is connected to another set of display processing units that includes an output unit by an internal data path is connected to the other set or sets of display processing units that it is connected to via respective internal data paths connecting the output units of the respective sets of display processing units.

Thus, in an embodiment, an internal data path connects the output unit of the first set of display processing units to the output unit of the second set of display processing units.

This may facilitate, for example, having one set of display processing units that is generating an output surface for display also provide that output surface to another set of display processing units for output to a further display, e.g., in the case, where there is a single output surface to be provided to plural displays, with that single output surface being generated by one set of display processing units, but then provided to a second set of display processing units for provision to a second display (e.g. where it is desired to "clone" the display (present the same surface (layer) on plural displays)).

In an embodiment, connected pairs of sets of display processing units are both connected by internal data paths connecting their respective processing units and by an internal data path or paths connecting their respective output units (if present).

The control unit of the display controller can selectively activate one or more of the first and second sets of display processing units (and any further sets of display processing units that may be present) to process one or more input surfaces to generate one or more output surfaces for display in any suitable and desired manner.

In an embodiment, the control unit can selectively activate a single set of display processing units, and can also activate plural sets (e.g. all of the sets) of display processing units (so as to be active at the same time (simultaneously). The control unit can in an embodiment activate plural sets of display processing units to operate (simultaneously (in parallel)) to each produce their own respective output surfaces independently of each other, or activate plural (e.g. a pair of) sets of display processing units to operate (simultaneously (in parallel)) in combination to provide an output surface (as will be discussed in more detail below).

Thus, in an embodiment, the control unit can activate the first set of display processing units alone, the second set of display processing units alone, or both the first and second sets of display processing units together (in an embodiment either to produce their own respective separate output surfaces, or to process input surfaces in combination to provide an output surface).

The control unit can in an embodiment also, accordingly, selectively configure the passing of pixel data of a surface between respective sets of display processing units via an internal data path (or paths) that connect those sets of display processing units, for example to configure one set of display processing units to pass pixel data of a surface to another set of display processing units via an internal data path (or not). In an embodiment the control unit can, in effect, configure the data flow across the internal data paths connecting respective sets of data processing units so as to either enable or disable (and trigger) the passing of pixel data via the internal data path (and, e.g., the direction in which the pixel data is to be passed).

Thus, in an embodiment, the control unit can also selectively activate the passing of pixel data of a surface between sets of display processing units via an internal data path and, in an embodiment can, in an embodiment selectively and individually, activate the passing of data for plural, and in an embodiment for each, internal data path that is provided.

The control unit can in an embodiment also configure the operation of an active set of display processing units, e.g. in terms of the input surfaces that will be read, the processing operation(s) (e.g. composition) that those input surfaces will undergo, and whether the processed surfaces are to be provided as an output surface to a display or otherwise.

Correspondingly, the control unit is in an embodiment able to configure the flow of surfaces (surface data) through a set of display processing stages, and whether data of a surface should be passed to another set of display processing units via an internal data path or not. In an embodiment, the control unit is capable of directing the data flow for (e.g. input) surfaces individually, i.e. such that different surfaces can be directed to different processing units, stages, etc., independently of each other.

Thus the control unit can in an embodiment configure an (active) set of display processing units to send surface data to another set of display processing units via an internal data path and/or to receive surface data from another set of display processing units via an internal data path (and in this latter case to then, e.g., process the received surface data).

In an embodiment, the control unit is operable to select an operating mode for the display controller (processing core), wherein when selecting an operating mode for the display controller the control circuitry selectively configures the one or more internal data paths to pass pixel data for an output surface between respective sets of processing stages.

The control unit can selectively activate sets of display processing units, the passing of data via an internal data path, etc., in any suitable and desired manner. In an embodiment, this is done by setting appropriate control registers of the sets of display processing units. In this case, each respective unit of a set of display processing units, thus the input unit, processing unit and output unit (if present), etc., in an embodiment has its own respective set of control registers that can be configured accordingly by the control unit to control the operation of that unit of the set of display processing units. Other arrangements would, of course, be possible.

The control unit operates in response to signals received by the control unit. Such signals are in an embodiment provided from a host processor of the data processing system that the display controller is part of, e.g., and in an embodiment, in response to requests for the display of images by an application or applications executing on the host processor.

In an embodiment, a driver for the display controller is provided (and executes) on the host processor, which driver then generates the appropriate control commands (instructions) that are received by the control unit for controlling the operation of the display controller. The driver in an embodiment generates the control commands in response to instructions received for display processing from an application or applications executing on the host processor.

As discussed above, an advantage of the technology described herein is that a single driver executing on the host processor can control (via the control unit) the display controller of the technology described herein to operate in a variety of different modes for the provision of output surfaces for display (in contrast, for example, to arrangements which utilise plural display controllers and/or display processing cores, and thus which may require the execution of plural drivers on a host processor for the overall control of the display operation).

The control unit accordingly in an embodiment has an appropriate interface for receiving control signals from the, e.g. driver (e.g. a programming interface). In an embodiment the control unit can also signal interrupts to the host processor (e.g. to the driver on the host processor) so as to facilitate control of the display controller.

Other arrangements would, of course, be possible.

The control unit may be provided as an overall (centralised) control unit of the display controller, or may be provided as one or more separate, e.g. distributed, units that together provide the overall control of the display controller.

The various units, stages, etc., of the display controller of the technology described herein may be implemented as desired, e.g. in the form of one or more fixed-function units (hardware) (processing circuitry) (i.e. that is dedicated to one or more functions that cannot be changed), or as one or more programmable processing units (stages), e.g. by means of programmable processing circuitry that can be programmed to perform the desired operation. There may be both fixed function and programmable units or stages (processing circuitry).

In some embodiments, the display controller comprises, and/or is in communication with, one or more memories and/or memory devices that store the data described herein, and/or that store software for performing the processes described herein. The display controller is in an embodiment also in communication with a host microprocessor, and/or with one or more (and in an embodiment plural, in an embodiment two) displays for displaying output surfaces generated by the display controller.

Each display that the display controller of the technology described herein is used with may be any suitable and desired display, such as for example, a screen or a printer. In an embodiment, one display comprises the overall data processing system's (device's) local display (screen) and another (the second) display comprises an external display (e.g. connected via a wired or wireless connection).

In an embodiment, the display controller of the technology described herein forms part of a data processing system. Thus, another embodiment of the technology described herein comprises a data processing system comprising the display controller described above.

The data processing system may and in an embodiment does also comprise one or more of, and in an embodiment all of: a central processing unit, a graphics processing unit, a video processor (codec), a system bus, a memory controller, a main memory, and a display or displays (e.g. a local display).

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays.

Thus, an embodiment of the technology described herein comprises a data processing system comprising:

a host processor;

a main memory;

a display;

one or more processor units configured to generate input surfaces for display and to store the input surfaces in the main memory; and a display controller, the display controller comprising:

a first set of display processing units comprising a first input unit operable to read at least one input surface from the main memory, a first processing unit operable to process one or more input surfaces to generate an output surface, and a first output unit operable to provide an output surface for display to the display;

a second set of display processing units comprising a second input unit operable to read at least one input surface from the main memory, a second processing unit operable to process one or more input surfaces to generate an output surface, and a second output unit operable to provide an output surface for display to a display;

one or more internal data paths via which pixel data of a surface may be passed between the first and second sets of display processing units; and a control unit comprising control circuitry operable to, in response to control signals received by the control unit from the host processor, selectively activate one or more of the first and second sets of display processing units to process one or more input surfaces to generate one or more output surfaces for display.

As will be appreciated by those skilled in the art, this embodiment of the technology described herein can and in an embodiment do include one or more, and in an embodiment all, of the features of the technology described herein described herein.

The display controller of the technology described herein may be operated in any appropriate and desired manner.

In an embodiment the display controller is operable in plural modes of operation, i.e. the display controller is in an embodiment controllable to operate in plural modes of operation as appropriate and/or desired.

As discussed above, in an embodiment, the mode of operation of the display controller is controlled by an application, e.g. running on a host processor, in an embodiment by the application generating instructions which are interpreted by a driver for the display controller (that is running on the host processor) to generate appropriate commands to the display controller to operate as required by the application.

In operation, the display controller may be (and in an embodiment is) used to provide output surfaces to one or plural displays, e.g. to a first (local) display and/or a second (external) display. Where output surfaces are provided to plural (two) displays, the output surfaces for display may be the same or different, for example one display may require and use a different resolution and/or aspect ratio to the other display.

In an embodiment, one set (e.g. the first set) of display processing units can be activated (alone) to process input surfaces to generate an output surface and to provide that output surface to a display.

In an embodiment, two sets of display processing units (e.g. the first and second sets of display processing units) can be activated to each respectively process one or more input surfaces to generate a respective output surface, and to provide their respective output surfaces to a respective display. In this case therefore, there may be (and in an embodiment is) two different output surfaces being generated, one by each respective set of display processing units, and provided to respective (different) displays.

In these modes of operation, pixel data need not be (and in an embodiment, isn't) passed from one set of display processing units to another set of display processing units via an internal data path or paths.

In an embodiment, one set of display processing units may be activated to process one or more input surfaces to provide an output surface for display, and to also provide that generated output surface via an internal data path or paths to another set of display processing units for provision to a further (e.g. second) display. This would then allow an output surface that is generated by using a single set of display processing units to be displayed on two displays simultaneously.

In an embodiment, plural (e.g. the first and second) sets of display processing units can be, and in an embodiment are, operated together to generate an output surface, e.g. for display, e.g. on a single (e.g. local or external) display. This can then allow the processing resources of more than one set of display processing units to be used in combination when generating an output surface.

For example, where it is desired to process (e.g. compose) more surfaces (layers) than could otherwise be handled by one set of display processing units, another set or sets of display processing units can be used to (and in an embodiment is used to) pre-process (e.g. pre-compose, i.e. "flatten") some of the surfaces to generate a pre-processed (e.g. pre-composited) surface, and to then pass the pre-processed surface to one set of display processing units via an internal data path, i.e. without writing the pre-processed surface out to memory. The pre-processed surface can then be used as an input by the one set of display processing units to generate an output surface.

In this way, the display controller of the technology described herein can accordingly be used to perform relatively sophisticated processing (e.g. composition) in a particularly efficient manner, e.g. without a graphics processing unit having to perform pre-composition ("flattening"), or having to write out "intermediate" (e.g. pre-composed) or other surfaces to memory.

In these embodiments, the another (e.g. second) set or sets of display processing units is operated to generate an output surface or surfaces, and to then pass the output surface or surfaces to the (e.g. first) set of display processing units that is to provide the output surface for display via an internal data path or paths. The (e.g. first) set of display processing units that is to provide the output surface for display is then operated to generate and provide an output for display to one (e.g. the local) display and uses the output surface or surfaces provided from the another (e.g. second) set or sets of display processing units via the internal data path as an (additional), e.g. input, surface from which the output surface for display is generated.

In these embodiments, the another (e.g. second) set or sets of display processing units may be used to perform any processing operation(s) as desired (such as decoding, decompression, scaling and/or composition), e.g. on one or more input surfaces, and to then pass the processed surface or surfaces to the (e.g. first) set of display processing units that is to provide the output surface for display via the internal data path(s) for use by the (e.g. first) set of display processing units that is to provide the output surface for display.

In these embodiments, the (e.g. first) set of display processing units that is to provide the output surface for display (e.g. set of display processing units) may be operated to process the received output surface(s) to generate an output surface for display on the (e.g. local) display in any desired manner. In one embodiment, the received output surface is subjected to (at least) composition by the (e.g. first) set of display processing units that is to provide the output surface for display.

Thus, according to an embodiment, the first set of display processing units in an embodiment reads at least one input surface, composes one or more of the input surfaces and an output surface received from another set of display processing units to generate a composited output surface, and provides the composited output surface for display to a display (and the display controller is configured accordingly).

In these embodiments, a pair of sets of display processing units could be used together to provide an output surface, or more than two sets of display processing units could be used in combination to provide an output surface. In the latter case, each set of display processing units could be used to provide an output surface with one of the sets of display processing units then forming a final output surface by combining the respective output surfaces generated by the three or more sets of display processing units, and/or one set of display processing units could provide its output surface to another set of display processing units which then combines that output surface with a further (input and/or output) surface or surfaces, and then provides the combined surface to a further set of display processing units for combination with a further (input and/or output) surface or surfaces of that display processing unit (for example), and so on.

In another arrangement where both sets of display processing units are active (are being used to process input surfaces), each set of display processing units is used to process a respective portion (subarea) of an overall output surface (frame) that is to be displayed. In this case, each set of display processing units could be used to process one respective, e.g. half, of the overall output surface that is to be provided (displayed). In an arrangement the output surface to be generated is split into portions (e.g. two halves) vertically.

In this case therefore, one set of display processing units will generate one portion (e.g. half) of the output surface to be displayed, with the other set of display processing units generating the other portion (e.g. half) of the output surface to be displayed. In this case, in order to be able to display the output surface, a set of display processing units that is providing the output surface to a display would provide its output surface portion to the display via its output unit, e.g. in the normal manner, but would also receive pixel data for the other portion of the output surface that is to be displayed at its output unit for display from the other set of display processing units that is generating that other portion of the output surface via an internal data path connecting the two sets of display processing units, and in an embodiment via an internal data path connecting the respective output units of the two sets of display processing units.

This arrangement would then allow, for example, two pixels of an output surface to be displayed to be produced per clock cycle (one pixel by each respective set of display processing units), thereby, for example, allowing a given resolution output surface (frame) to be produced whilst operating the display controller at, e.g. half, the clock frequency than would be required if only a single set of display processing units was being used to produce the entire output surface (frame). This can accordingly reduce the power consumption required to produce the output surface, and so may, in particular, facilitate providing higher resolution (e.g. 4K) output surfaces with reduced power requirements (in an, effectively, "low power" mode).

Where more than two sets of display processing units are provided in the display controller, then an output surface to be generated can accordingly be respectively subdivided between those plural sets of display processing units in a corresponding manner.

Thus, in an embodiment, the display controller of the present operation can be, and is in an embodiment, operated such that respective sets of display processing units of the display controller are each configured to and operate to generate respective parts (subareas) of an overall output surface to be displayed (with one of the sets of display processing units then, in effect, providing the combined respective parts of the output surface to a display for display).

In this case therefore, respective parts (e.g. halves) of an output surface to be produced will be processed in parallel (side-by-side) by different sets of display processing units of the display controller. This can accordingly enable clock frequency requirements for the display controller to be reduced when producing an output surface of a given resolution, thereby facilitating a reduction in power consumption in the display controller.

Indeed, it is a particular advantage of the arrangement of the technology described herein that providing the respective sets of display processing units such that they share appropriate control resources, etc., facilitates this operation because the timing of the provision of the pixels for the respective parts of the output surface by the different sets of display processing units will, in effect, automatically be appropriately synchronised (which would not be the case and may not be achievable where, for example, plural different display processing cores and/or display controllers were being used).

In these embodiments, those parts of the another (e.g. second) set or sets of display processing units that are not needed (not used) can be (and in an embodiment are) inactivated, i.e. turned off. Thus, for example, where no output surface is provided to the second display, those parts of the second set of display processing units that are used to provide an output surface to the second display, such as the second output unit, etc., can be (and in an embodiment are) inactivated. This will accordingly reduce the power used by the display controller.

These embodiments may be particularly appropriate where the another (e.g. second) set or sets of display processing units are not otherwise required to generate a different output surface for display. In this case therefore, a single output surface to be provided for display by one (e.g. the first) of the sets of display processing units can be generated using additional processing performed by the another (e.g. second) set or sets of display processing units when the another set or sets of display processing units are not otherwise in use (e.g. are not causing an image to be displayed on a second display).

For example, the first and second sets of display processing units may be (and in an embodiment are) operated together to display an output surface on a single (e.g. local or external) display. That is, where it is desired to provide an output surface to only one (e.g. local or external) display (as may often be the case), instead of only one of the sets of display processing units being used to generate and provide an output surface for its associated display while another set of display processing units is unused, plural (e.g. both) sets of display processing units may be (and are) used in tandem to generate an output surface for the single display.

It would also be possible for the another (e.g. second) set or sets of display processing units to both pass an output surface to a set of display processing units via an internal data path or paths and to provide the or an output surface for display on another display (and in an embodiment this can be, and in an embodiment is, done). In this case therefore, one set of display processing units will both generate and display an output surface, and additionally provide the or an output surface to another set of display processing units via an internal data path, with the another set of display processing units then using that provided output surface in combination with one or more other surfaces to provide a further output surface for display (e.g. either as received, or by processing that output surface, e.g., to compose it with one or more other input surfaces).

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, units, stages, and "means" of the technology described herein may comprise a suitable processor or processors, controller or controllers, functional units, circuitry, processing logic, microprocessor arrangements, etc., that are configured to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing units, stages, etc., may share processing circuitry, etc., if desired.

Furthermore, any one or more or all of the processing units, stages, etc., of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing units, stages, and processing unit (stage) circuitry of the technology described herein may be provided as a separate circuit element to any one or more of the other processing units, stages or processing stage circuitry, and/or any one or more or all of the processing units, stages and processing stage circuitry may be at least partially formed of shared processing circuitry.

Subject to any hardware necessary to carry out the specific functions discussed above, the display controller can otherwise include any one or more or all of the usual functional units, etc., that display controllers include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or data processing system comprising a data processor causes in conjunction with said data processor said controller, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

FIG. 1 shows an embodiment of a data processing system that includes a display controller 12 that is in accordance with the technology described herein. The data processing system 13 includes a media processing subsystem 14, in the form of a system on-chip (SoC).

As shown in FIG. 1, the media processing subsystem 14 comprises a central processing unit (CPU) 9, graphics processing unit (GPU) 2, a video codec 1, the display controller 12, and a memory (DRAM) controller 10. As shown in FIG. 1, these communicate via an interconnect 11 and have access to off-chip main memory 3.

The display controller 12 also has interfaces to a local display 6 of the data processing system (which may, e.g., be a display panel of the device, e.g. mobile phone, that the data processing system is part of), and an interface (e.g. an HDMI, MHL, or Display Port, etc., interface) to a second, external display 8 (which may, for example, be an HD TV).

The CPU 9 executes, inter alia, a driver 15 for providing control signals and data to the display controller 12 to control and configure the display controller 12 to process input surfaces to generate appropriate output surfaces for display (and otherwise), in response to commands and data received from applications 16 executing on the CPU 12 that require the display of frames (images) on a display or displays.

In operation of this system, one or more input surfaces will be generated by the video codec 1, GPU 2 and/or CPU 9, and stored in the main memory 3. The stored input surfaces will then be read by the display controller 12 and, e.g. combined (composed) to generate a (e.g. composited) output surface or surfaces for display, which output surface(s) are then provided to one or both of the local display 6 and external display 8 by the display controller 12 for display.

Figure 2:
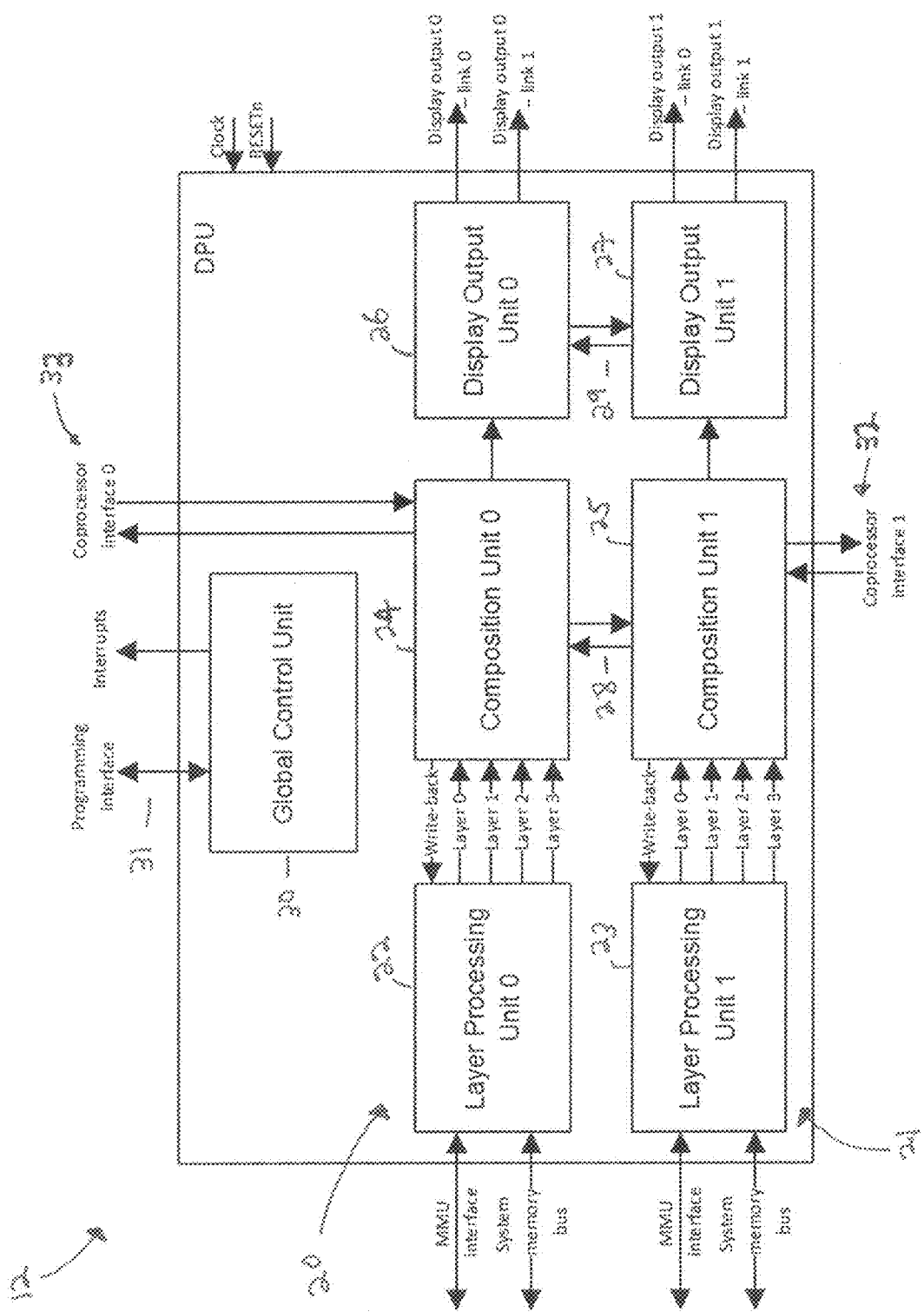
FIG. 2 shows schematically a display controller according to an embodiment of the technology described herein.

FIG. 2 shows the display controller (display processing unit (DPU)) 12 in more detail.

As shown in FIG. 2, the display controller 12 includes a first set of display processing units 20 and a second set of display processing units 21.

Each set of display processing units is, as shown in FIG. 2, operable to read-in one or more input surfaces, process those input surfaces to generate an output surface or surfaces, and to then provide an output surface to a respective display.

In order to do this, each set of display processing units includes a respective input unit 22, 23 in the form of a layer processing unit that, as will be discussed in more detail below, is operable to read one or more surfaces from memory (as shown in FIG. 2), process those surfaces and then provide those surfaces to a respective processing (composition) unit 24, 25. As will be discussed further below, the processing (composition) units 24, 25 are each operable to process input surfaces received, for example, from their respective input units, and to perform processing such as scaling and composition of those input surfaces, to generate an output surface.

Each set of display processing units further includes a respective output unit 26, 27, in the form of a display output unit, which is operable to receive, as shown in FIG. 2, an output surface from the respective processing (composition) unit of their set of display processing units, and to provide that output surface to a display for display (via an appropriate display interface).

In the present embodiment, the first set of display processing units 20 is configured to provide its display output to the local display 6 of the data processing system, and the second set of display processing units 21 is configured to provide its display output to an external display interface (to the external display 8). Other arrangements would, of course, be possible.

As shown in FIG. 2, the display controller 12 also includes internal data paths 28, 29 via which (RGB) pixel data for a surface may be passed between respective units of the respective first and second sets of display processing units. In particular, as shown in FIG. 2, there is an internal data path 28 via which surface data may be passed between the composition units 24, 25 of the two sets of display processing units, and a further internal data path 29 via which pixel data for a surface may be passed between the output units 26, 27 of the first and second sets of display processing units.

In the present embodiments, these internal RGB pixel data paths 28, 29 that connect the sets of display processing units comprise a pixel interface carrying parallel RGB samples with Valid/Ready synchronization signals and use a similar protocol to the data transfer between units of a set of display processing units, such as from the input unit to the processing (composition) unit. In each clock cycle, RGB pixel data can be transferred together with a Valid signal generated by the "sending" unit. The data transfer can be stalled by the "receiving" unit, through de-assertion of a Ready signal.

Other arrangements for internal data paths would, of course, be possible.

As shown in FIG. 2, the display controller 12 also includes a control unit 30. This control unit 30 is operable to control and configure the operation of the sets of display processing units of the display controller 12, in response to control signals 31 received from the driver 15 for the display controller 12. The control unit 30 provides software access (from the host CPU 9) to the appropriate control registers, interrupt infrastructure, etc. of the display controller 12.

In particular, an application will generate instructions which are interpreted by the driver 15 for the display controller 12 (that is running on the host processor) to generate appropriate commands to the display controller 12 to operate as required by the application. The driver programs appropriate control registers in the control unit 30, and the control unit furthers translates this configuration into hardware control signals for the units of the display controller. Thus, different modes of operation such as dual display composition can be enabled or disabled dynamically by software, depending on the requirements of the high-level application.

The first and second sets of display processing units 20, 21 and the global control unit 30 are all provided as the same processing core, and thus, for example, as shown in FIG. 2, share a common clock and reset inputs.

As shown in FIG. 2, each composition unit 24, 25 also has a respective co-processor interface 33, 32. These co-processor interfaces allow surface data to be transferred to and from external (e.g. post-composition) processing stages that are outside of the display controller itself, if desired. They may, for example, expose parallel RGB pixel streams with synchronisation signals. This provides additional flexibility to the display controller and its overall operation. (Indeed, in an embodiment, a, and in an embodiment each, set of display processing units comprises a data path via which pixel data of a surface may be passed between the set of display processing units and an external processor. These external data paths are in an embodiment configured in a similar manner to the internal data paths of the display controller, and are in an embodiment provided from the processing unit (and in an embodiment the composition unit) of a set of display processing units.)

Figure 3:
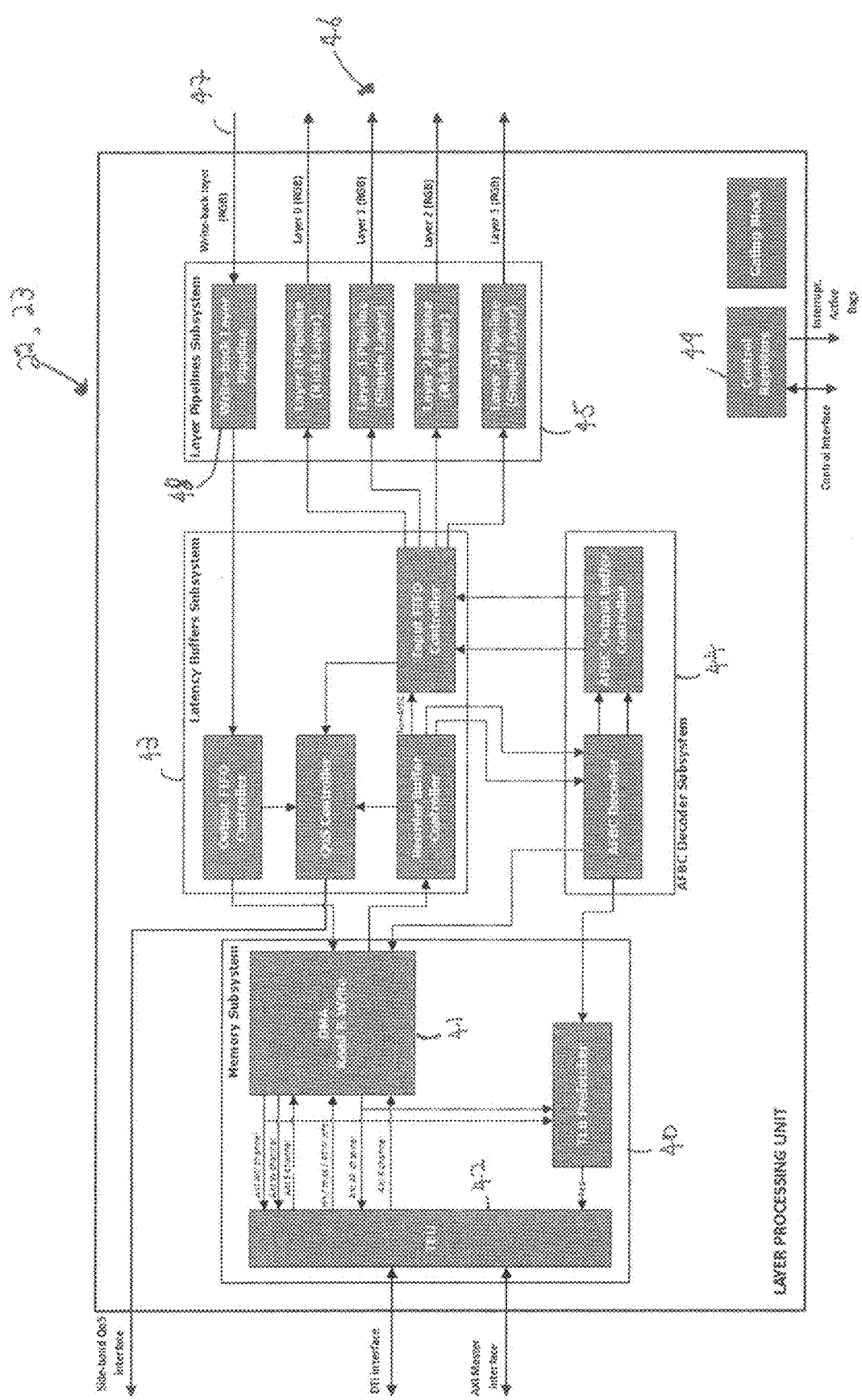
FIG. 3 shows schematically an input unit of a display controller according to an embodiment of the technology described herein.

FIG. 3 shows the input units (layer processing units) of the sets of data processing units of the display controller 12 in more detail. Each input unit 22, 23 has the configuration shown in FIG. 3.

As shown in FIG. 3, each input (layer processing) unit includes a memory subsystem 40 that includes a direct memory access (DMA) read and write controller 41 and appropriate table lookaside buffer 42 functionality to allow it to read one or more input surfaces from one or more frame buffers in the main memory 3 via the memory bus (and as shown in FIG. 2 and FIG. 3 to also be able to write one or more surfaces from the display controller 12 to one or more frame buffers in the main memory 3).

As shown in FIG. 3, each input (layer processing) unit also includes a latency buffers subsystem 43 that includes one or more real-time FIFO (first in, first out) modules which are used to buffer the one or more input surfaces as they are read from memory and/or decoded, e.g. for latency hiding purposes.

Coupled to the latency buffer subsystem 43 is a frame buffer compression decoder subsystem 44 which can be used to (selectively) decode (decompress) received input surfaces as necessary, before onward transmission of the one or more input surfaces. In particular, data of a compressed input surface may be directed to the decoder subsystem 44 for decoding, before the decoded surface data is then returned to the latency buffer subsystem 43 for onward transmission for processing.

The input surfaces read by the input (layer processing) unit are, as shown in FIG. 3, provided (via the latency buffer subsystem 43) to respective layer pipelines of a layer pipeline subsystem 45. In the present embodiment, the layer pipeline subsystem 45 includes four (input) layer pipelines and so the input unit can read and process up to four different input surfaces (layers) for use to generate an output frame. The input layers may comprise, for example, one or more video layers, e.g. generated by a video processor (codec) 1, one or more graphics layers, e.g. graphics windows generated by a graphics processing unit (GPU) 2, and so on.

(However it will be appreciated that any number of layer pipelines may be provided and used in the technology described herein, depending upon the application in question (and also depending upon any silicon area constraints, etc.).

Each layer pipeline performs appropriate operations on the input surfaces, such as pixel unpacking from the received data words, colour (YUV to RGB) conversion, and inverse transform (gamma) correction such as sRGB.

The layer pipeline's output 46 respective RGB pixel data of the input surface that they have processed to the processing (composition) unit of their respective set of display processing units (as shown in FIG. 2).

As shown in FIG. 3, the input units also include a writeback layer pipeline 48 in the layer pipeline subsystem 45 (and an overall writeback path) to allow surfaces 47 from the processing (composition) unit to be written back to the main memory, if desired. This may be appropriate where, for example, a surface to be displayed will also be required for future use.

As shown in FIG. 3, the input (layer processing) unit also includes an appropriate set of control registers 49 having an appropriate interface to the control unit 30 via which the operation of the input (layer processing) unit can be set and controlled in use by the control unit 30.

Figure 4:
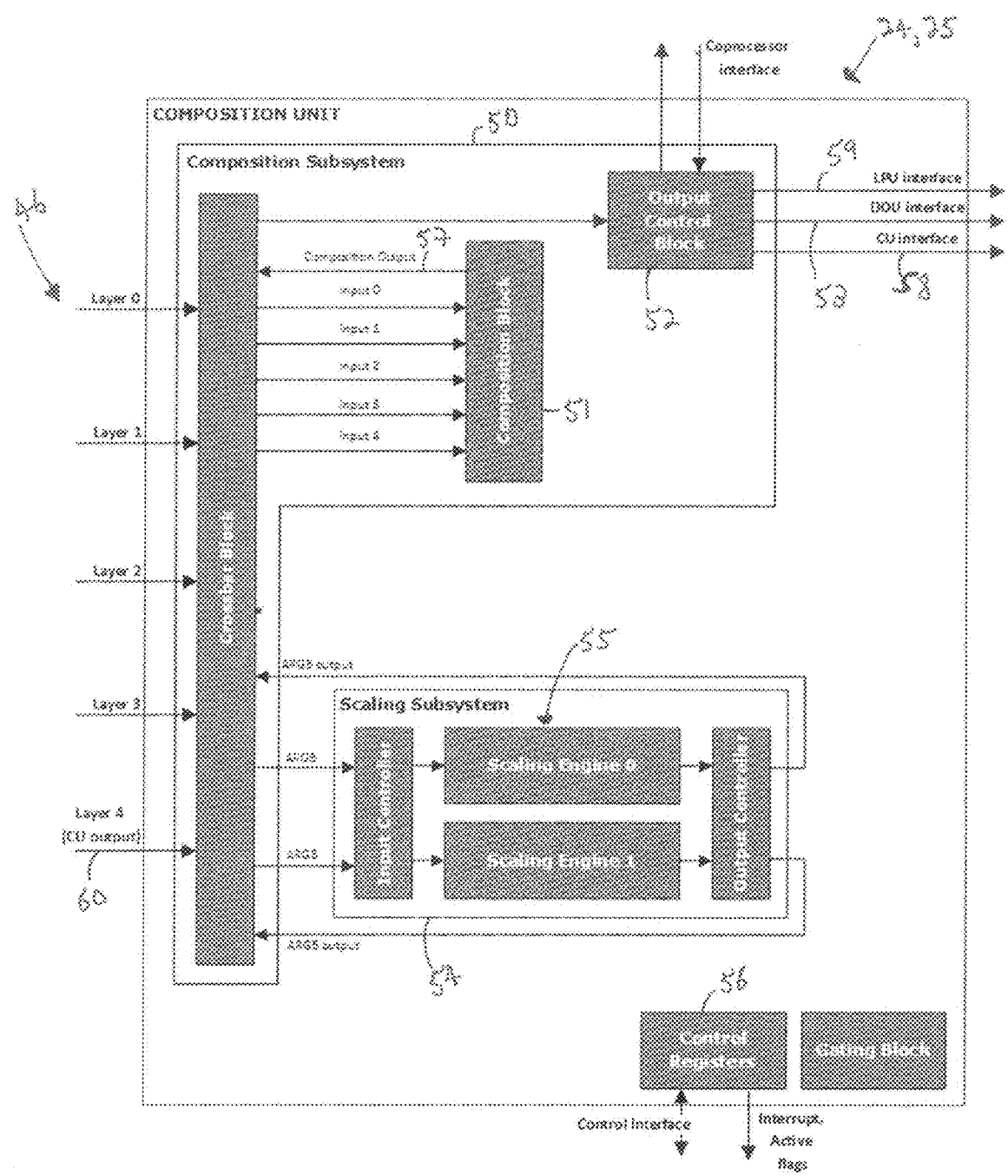
FIG. 4 shows schematically a processing unit of a display controller according to an embodiment of the technology described herein.

FIG. 4 shows the processing (composition) unit of a set of display processing units of the display controller 12 in more detail. Each of the processing (composition) units 24, 25 of the first and second sets of display processing units is configured as shown in FIG. 4.

As shown in FIG. 4, the output (composition) unit comprises a composition subsystem 50, which receives 46 input surface data from the layer processing pipelines 45 of the input (layer processing) unit, and includes a composition block 51 that is operable to compose received input surfaces to provide a composited output surface 57. The composition block 51 operates to compose received input surfaces to generate a composited surface, e.g. by appropriate alpha blending operations, etc.

As shown in FIG. 4, the composition subsystem 50 can also receive 60 surface data from the processing (composition) unit of another set of display processing units via an internal data path (as shown in FIG. 2) for use as an input surface for processing.

As shown in FIG. 3, the composition subsystem 50 can then output the composited output surface: to the output (display output) unit of the set of display processing units that the processing (composition) unit belongs to via a display output interface 53; to the processing (composition) unit of another set of display processing units of the display controller via an internal data path interface 58; and/or to the input (layer processing) unit of the set of display processing units that the processing (composition) unit belongs to for writing back to memory via an input (layer processing) unit interface 59.

The composition subsystem 50 includes an appropriate output control block 52 for controlling and sending the output composited surface data to the desired other unit or units of the display controller 12.

As shown in FIG. 4, the processing (composition) unit also includes a scaling subsystem 54 that can be used to scale a surface or surfaces. The scaling subsystem 54 includes one or more scaling engines 55 for this purpose. The scaling subsystem 54 can be used to scale both input surfaces received by the processing (composition) unit and a composited surface that has been generated by the composition block 51 of the composition subsystem 50.

Each scaling engine 55 operates to (selectively) scale (i.e. upscale or downscale) a surface to generate a scaled version of that surface. In the present embodiment, the degree to which a surface is scaled can be selected as desired, i.e. depending upon the particular application, etc.

Each scaling engine may be configured to perform, e.g., multi-tap finite impulse response (FIR) filtering. Other scaling arrangements would, of course, be possible.

A scaled surface can then be further composited with other surfaces by the composition block 51 or it can be output by the composition subsystem 50 for display and/or further processing, etc., without further processing by the composition subsystem 50.

As shown in FIG. 4, the processing (composition) unit also includes an appropriate set of control registers 56 having an appropriate interface to the control unit 30 via which the operation of the processing (composition) unit can be set and controlled in use by the control unit 30.

Figure 5:
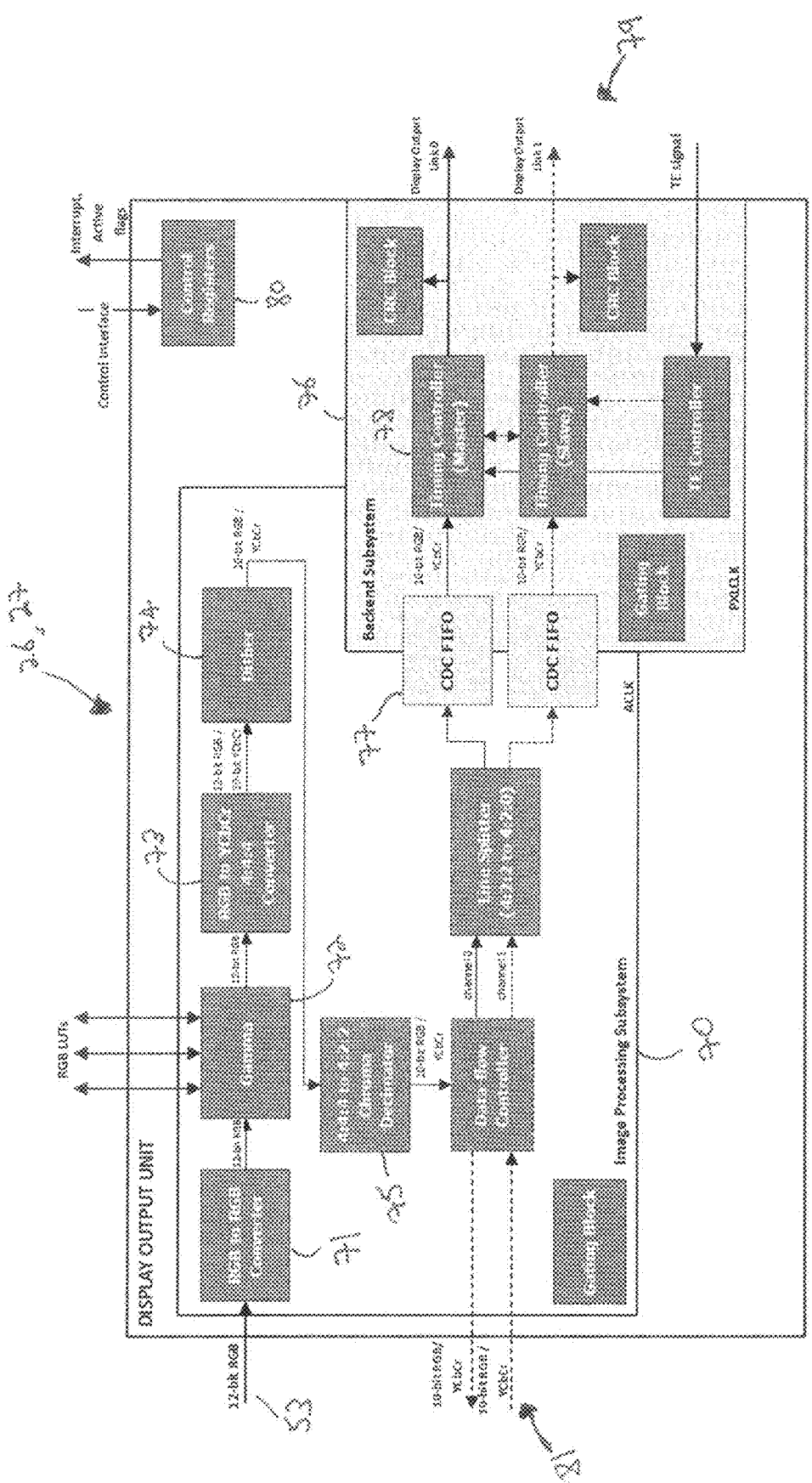
FIG. 5 shows schematically an output unit of a display controller according to an embodiment of the technology described herein.

FIG. 5 shows in more detail the configuration of the output unit (display output unit) of a set of display processing units of the display controller 12 of the technology described herein. Thus the output (display output) units 26, 27 of the respective sets of display processing units 20, 21 are configured as shown in FIG. 5.

As shown in FIG. 5, the output (display output) unit includes an image processing subsystem 70 that includes a display processing pipeline and receives 53 the, e.g. composited, output surface (frame) for display from the corresponding processing (composition) unit of its set of display processing units.

The display processing subsystem 70 is configured to selectively carry out any desired processing operation(s) on the composited output surface (frame), and to then transmit the (processed) composited output frame to a backend subsystem 76 that provides the output surface appropriately to the display.

As shown in FIG. 5, in the present embodiment, the image processing subsystem 70 includes an RGB to RGB converter 71, a gamma correction stage 72 configured to carry out gamma correction on the output surface, a colour conversion stage 73 configured to apply a colour conversion to the output surface, a dithering stage 74 configured to apply dithering to the output surface and a chroma decimator stage 75. It also has appropriate internal data paths 81 for transferring pixel data to/from other sets of display processing units.

The backend subsystem 76 includes appropriate latency hiding buffers (FIFOs) 77, and timing controllers 76 that control the timing of the provision 79 of pixel data to the corresponding display that the output (display output) unit in question is coupled to (has an interface with).

The backend subsystem 76 is configured to send pixel data to its associated display with appropriate horizontal and vertical blanking periods.

Again, as shown in FIG. 5, the output (display output) unit also includes an appropriate set of control registers 80 that can be set by the control unit 30 to control the operation of the output (display output) unit.

In the present embodiment, each set of display processing units 20, 21, as will be appreciated from the above, is capable of processing one or more input surfaces for display in a single pass and without the need to write any intermediate data to the external memory.

In the present embodiment, the sets of display processing units of the display controller 12 can be operated in a number of different modes. In particular, either the first or second sets of display processing units can be activated on their own, or both sets of display processing units can be activated together (at the same time), for processing input surfaces for display.

Figure 6:
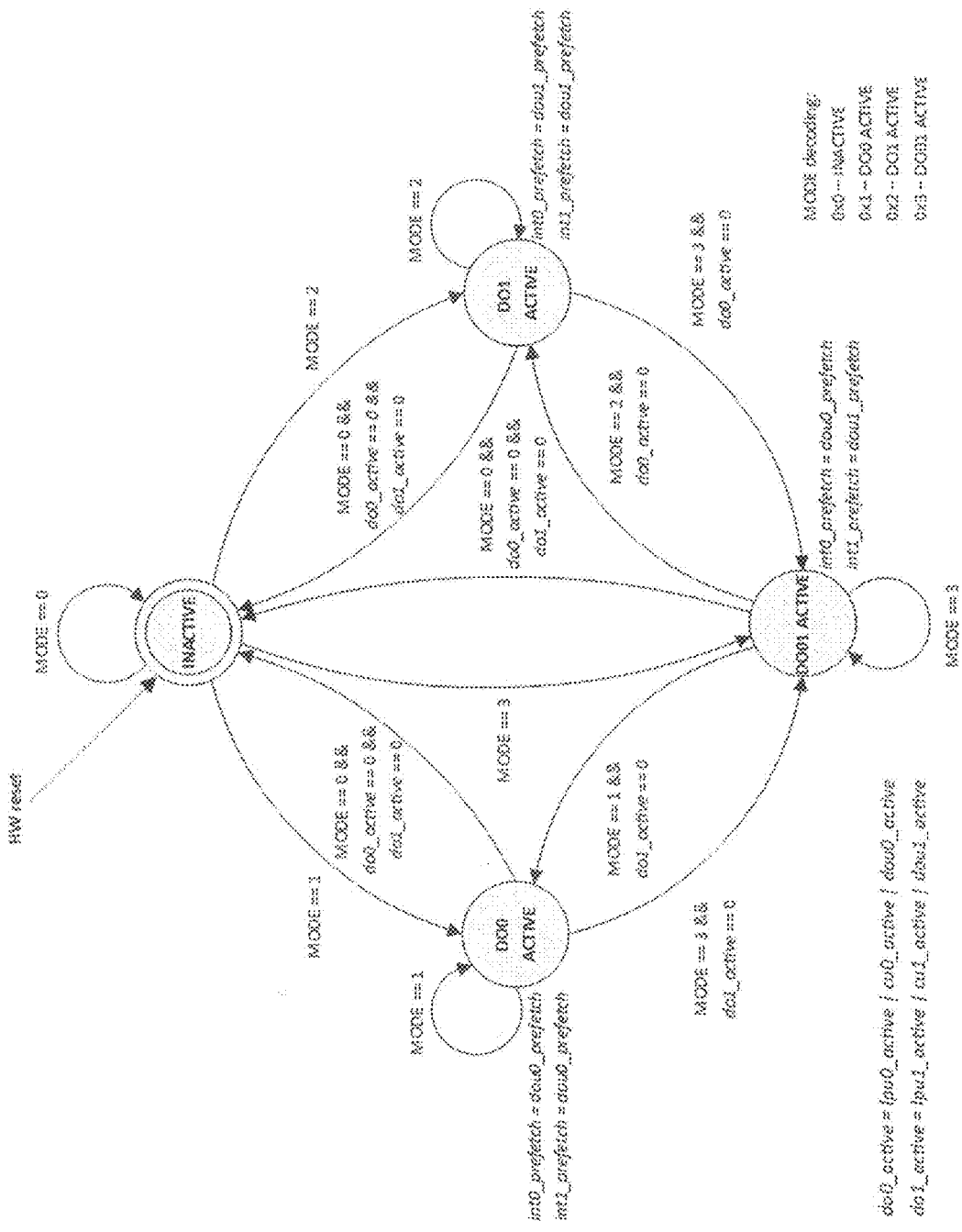
FIG. 6 shows a method of operating a display controller according to an embodiment of the technology described herein.

FIG. 6 is a state diagram illustrating these modes of operation of the display controller. Thus, as shown in FIG. 6, the display controller can be set by the control unit to an inactivate mode (mode 0), to a mode where the first set of display processing units only is active (mode 1), to a mode where only the second set of display processing units is active (mode 2), and to a mode where both sets of display processing units are active (mode 3).

When only one set of the display processing units is active, then that set of display processing units will read one or more input surfaces, process (e.g. compose) those one or more input surfaces, and provide the processed (e.g. composited) input surface(s) as an output surface for display on the display that the set of display processing units in question relates to (has an interface to).

In the case where both sets of display processing units are active, then various processing arrangements are possible.

For example, both sets of display processing units could simply operate to provide their own respective output surface to their own respective displays.

Alternatively, one set of display processing units could operate to generate an output surface for display, but also provide that output surface (via the appropriate internal data path) to the other set of display processing units for display. In this case, the output surface for display may, for example, be passed to the other set of display processing units via the internal data path 29 connecting the respective output units 26, 27 of the sets of display processing units.

Where both sets of display processing units are active, it would also be possible to use one of the sets of display processing units (e.g. the second set of display processing units 21) to perform some processing of input surfaces to provide an output surface for use then by the other (e.g. the first 20) set of display processing units for generating an output surface.

For example, where it is desired to composite six surfaces (layers) for display on the local display 6, four of the surfaces could be read and processed by the first set of display processing units 20, while the remaining two surfaces could be read by the second set of display processing units 21 and composited into a single composited surface (layer) which is then sent as an input to the processing (composition) unit 24 of the first set of display processing units 20 via the internal data path 28. The processing (composition) unit 24 of the first set of display processing units 20 may then compose the four input surfaces that it has read and processed together with the composited surface received from the second set of display processing units 21 to generate a final composited output surface for display.

It would be possible to cause the output frame generated by the second set of display processing units to be displayed on its display as well, if desired.

This arrangement will allow more surfaces (layers) to be composed, etc., than would be possible using a single set of display processing units, and without the GPU 2 (e.g.) having to perform pre-composition ("flattening") and without any additional reads/writes to main memory. This accordingly represents a particularly efficient technique for composing relatively sophisticated frames in a single display controller.

In another arrangement where both sets of display processing units are active (are being used to process input surfaces), each set of display processing units is used to process a respective portion (subarea) of an overall output surface (frame) that is to be displayed. In this case, each set of display processing units could be used to process one respective vertical half of the overall output surface that is to be provided (displayed). In this case therefore, respective parts (e.g. halves) of an output surface to be produced will be processed in parallel (side-by-side) by different sets of display processing units of the display controller.

In this case therefore, one set of display processing units will generate one half of the output surface to be displayed, with the other set of display processing units generating the other half of the output surface to be displayed. In this case, in order to be able to display the output surface, a set of display processing units that is providing the output surface to a display would provide its output surface "half" to the display via its output (display output) unit in the normal manner, but would also receive pixel data for the other half of the output surface that is to be displayed at its output (display output) unit for display from the other set of display processing units that is generating that other half of the output surface via an internal data path connecting the two sets of display processing units.

This arrangement will allow, for example, two pixels of an output surface to be displayed to be produced by the display controller per clock cycle (one pixel by each respective set of display processing units), thereby, for example, allowing the clock frequency requirements for the display controller to be reduced when producing an output surface of a given resolution. This can accordingly reduce the power consumption required to produce the output surface, and so may, in particular, facilitate providing higher resolution (e.g. 4K) output surfaces with reduced power requirements (in an, effectively, "low power" mode).

In these arrangements, where a display is not being used, it would be possible to inactivate (turn off) those parts of the set of display processing units that would otherwise be used to provide an image for display on that display, to further reduce power use. That is, if one of the sets of display processing units is (only) being used to support the other, its display pipeline (e.g.) can be disabled using software control to reduce power dissipation.

It would be possible to include further sets of display processing units in a display controller that is in accordance with the present embodiment (and the technology described herein).

Figure 7:
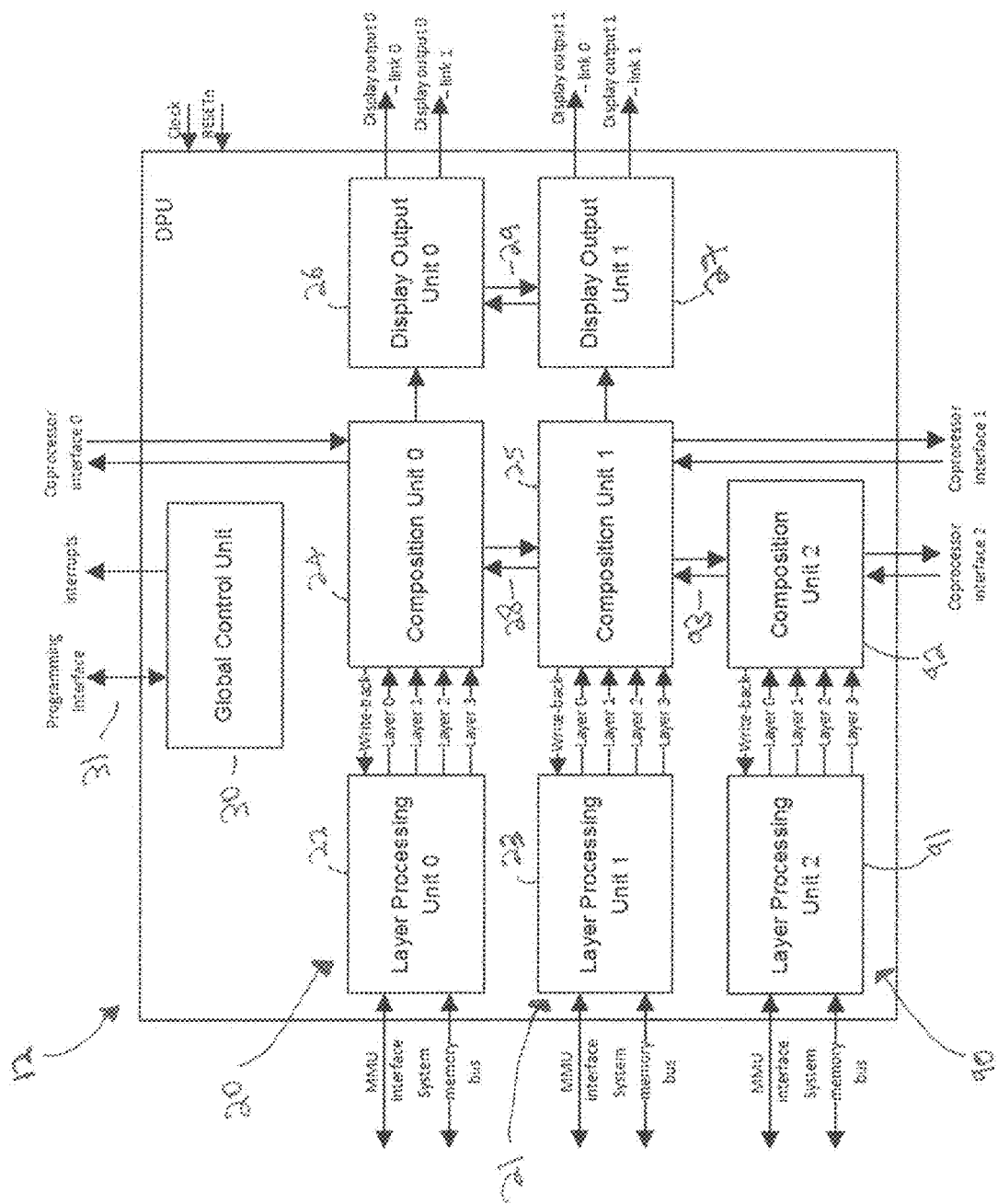
FIG. 7 shows schematically a display controller according to another embodiment of the technology described herein.

FIG. 7 shows an exemplary such arrangement which includes a third set of display processing units 90 which can provide supplemental processing for the first and second sets of display processing units. This arrangement of the display controller can accordingly support two display outputs and up to twelve display layers (whereas the arrangement in FIG. 2 can support two display outputs and up to eight display layers).

As shown in FIG. 7, the third set of display processing units 90 is configured to only include an input (layer processing) unit 91 and a processing (composition) unit 92. It also has an internal data path 93 connecting it to the processing (composition) unit 25 of the second set of display processing units 21. It is not provided with an output (display output) unit (but could be where an interface to a third display is desired).

The third set of display processing units 90 may be operated in combination with the other sets of display processing units as desired, for example in any of the manners discussed above. It could, for example, be used to process additional layers for provision to the second set of display processing units 21.

It can be seen from the above that the technology described herein, in its embodiments at least, facilitates the processing of display composition scenes with many display layers, enables support for more frame buffer compressed layers per composition scene, and the processing of display layers and/or of the composition scene in parallel in plural pipelines in an efficient and flexible manner, and with reduced silicon area when compared to typical display controller architectures.

The display controller can support many operation modes, such as single display output, two independent display outputs, and parallel (side-by-side) processing for a single display output, and the operation mode of the display controller may be changed between frames. The display controller can be controlled with a single software driver with the capability of dynamic allocation of display processing resources of the display controller. The configuration can also readily be scaled to increase the number of display processing resources provided, if desired.

This is achieved, in the embodiments of the technology described herein at least, by implementing plural sets of display processing units within the same display processing core, under the control of a centralised control unit, thereby enabling simplified software control of the whole display controller and smooth transitions between operation modes.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A display controller for a data processing system, the display controller comprising:
    a first set of display processing circuits comprising a first input circuit operable to read at least one input surface, a first processing circuit operable to process one or more input surfaces to generate an output surface, wherein the first processing circuit comprises a first composition circuit, wherein the first composition circuit is operable to compose two or more surfaces to generate a composited surface when generating an output surface, and a first output circuit configured to provide an output surface for display to a first display;
    a second set of display processing circuits comprising a second input circuit operable to read at least one input surface, a second processing circuit operable to process one or more input surfaces to generate an output surface, wherein the second processing circuit comprises a second composition circuit, wherein the second composition circuit is operable to compose two or more surfaces to generate a composited surface when generating an output surface, and a second output circuit configured to provide an output surface for display to a second display;
    one or more internal data paths configured to pass pixel data of a surface in both directions between the first and second sets of display processing circuits, wherein the one or more internal data paths are configured to directly pass pixel data of a surface between the first and second composition circuits and between the first and second output circuits; and
    a control circuit configured to, in response to control signals received by the control circuit, selectively activate one or more of the first and second sets of display processing circuits to process one or more input surfaces to generate one or more output surfaces for display, and selectively control direct passing of pixel data between the first and second composition circuits and between the first and second output circuits by selectively activating the direct passing of pixel data via the one or more internal data paths and selectively controlling the direction in which pixel data is directly passed.

2. The display controller of claim 1, further comprising one or more further sets of display processing circuits.

3. The display controller of claim 2, wherein each of the one or more further sets of display processing circuits comprises only an input circuit and a processing circuit.

4. The display controller of claim 1, wherein one of the processing circuits of the first or second sets of display processing circuits can receive as inputs for processing one or more input surfaces that have been read by an input circuit of the set of display processing circuits and a surface or surfaces for which pixel data is passed from another set of display processing circuit to the set of display processing circuits via an internal data path of the display controller.

5. The display controller of claim 1, wherein an output circuit of a set of display processing circuits is configured to receive an output surface for display from another set of display processing circuits of the display controller via an internal data path of the display controller.

6. The display controller of claim 1, wherein the one or more internal data paths of the display controller are arranged such that the first and second sets of display processing circuits are connected in series by the one or more internal data paths.

7. The display controller of claim 1, comprising an internal data path directly connecting the first processing circuit of the first set of display processing circuits to the second processing circuit of the second set of display processing circuits.

8. The display controller of claim 1, comprising an internal data path directly connecting the first output circuit of the first set of display processing circuits to the second output circuit of the second set of display processing circuits.

9. The display controller of claim 1, wherein the control circuit is configured to activate the first set of display processing circuits alone, the second set of display processing circuits alone, or both the first and second sets of display processing circuits together.

10. The display controller of claim 9, wherein the control circuit is configured to activate both the first and second sets of display processing circuits together to either to produce their own respective separate output surfaces for display, or to process input surfaces in combination to provide an output surface for display.

11. A data processing system comprising:
a host processor;
a main memory;
a display;
one or more processor circuits configured to generate input surfaces for display and to store the input surfaces in the main memory; and
a display controller, the display controller comprising:
a first set of display processing circuits comprising a first input circuit operable to read at least one input surface from the main memory, a first processing circuit operable to process one or more input surfaces to generate an output surface, wherein the first processing circuit comprises a first composition circuit, wherein the first composition circuit is operable to compose two or more surfaces to generate a composited surface when generating an output surface, and a first output circuit configured to provide an output surface for display to the display;
a second set of display processing circuits comprising a second input circuit operable to read at least one input surface from the main memory, a second processing circuit operable to process one or more input surfaces to generate an output surface, wherein the second processing circuit comprises a second composition circuit, wherein the second composition circuit is operable to compose two or more surfaces to generate a composited surface when generating an output surface, and a second output circuit configured to provide an output surface for display to a display;
one or more internal data paths configured to pass pixel data of a surface in both directions between the first and second sets of display processing units, wherein the one or more internal data paths are configured to directly pass pixel data of a surface between the first and second composition circuits and between the first and second output circuits; and
a control circuit configured to, in response to control signals received by the control unit from the host processor, selectively activate one or more of the first and second sets of display processing circuits to process one or more input surfaces to generate one or more output surfaces for display, and selectively control direct passing of pixel data between the first and second composition circuits and between the first and second output circuits by selectively activating the direct passing of pixel data via the one or more internal data paths and selectively controlling the direction in which pixel data is directly passed.

12. A method of operating a display controller in a data processing system, the display controller comprising:
a first set of display processing circuits comprising a first input circuit operable to read at least one input surface, a first processing circuit operable to process one or more input surfaces to generate an output surface, wherein the first processing circuit comprises a first composition circuit, wherein the first composition circuit is operable to compose two or more surfaces to generate a composited surface when generating an output surface, and a first output circuit configured to provide an output surface for display to a first display;
a second set of display processing circuits comprising a second input circuit operable to read at least one input surface, a second processing circuit operable to process one or more input surfaces to generate an output surface, wherein the second processing circuit comprises a second composition circuit, wherein the second composition circuit is operable to compose two or more surfaces to generate a composited surface when generating an output surface, and a second output circuit configured to provide an output surface for display to a second display;
one or more internal data paths configured to pass pixel data of a surface between the first and second sets of display processing circuits, wherein the one or more internal data paths are configured to directly pass pixel data of a surface between the first and second composition circuits and between the first and second output circuits; and
a control circuit configured to, in response to control signals received by the control circuit, selectively activate one or more of the first and second sets of display processing circuits to process one or more input surfaces to generate one or more output surfaces for display, and selectively control direct passing of pixel data between the first and second composition circuits and between the first and second output circuits by selectively activating the direct passing of pixel data via the one or more internal data paths and selectively controlling the direction in which pixel data is directly passed;
the method comprising:
the control circuit, in response to a control signal received by the control circuit, selectively activating one or more of the first and second sets of display processing circuits to process one or more input surfaces to generate one or more output surfaces for display;
the activated one or more of the first and second sets of display processing circuits processing one or more input surfaces to generate one or more output surfaces for display; and
the control circuit selectively controlling direct passing of pixel data for use when generating the one or more output surfaces for display between the first and second composition circuits and between the first and second output circuits of the activated one or more of the first and second sets of display processing circuits.

13. The method of claim 12, wherein an activated set of display processing circuits processes one or more input surfaces that have been read by an input circuit of the activated set of display processing circuits and a surface or surfaces for which pixel data is directly passed from another set of display processing circuits to the set of display processing circuits via an internal data path of the display controller to generate an output surface for display.

14. The method of claim 12, wherein the control circuit activates one of the first and second sets of display processing circuits alone.

15. The method of claim 12, wherein the control circuit activates both the first and second sets of display processing circuits.

16. The method of claim 15, wherein the first and second sets of display processing circuits each generate their own respective separate output surfaces for display.

17. The method of claim 15, wherein one of the first and second sets of display processing circuits is activated to process one or more input surfaces to generate an output surface and to display that output surface, and to also provide the generated output surface directly via an internal data path or paths to the other set of display processing circuits for display.

18. The method of claim 15, wherein one of the first and second sets of display processing circuits is activated to process one or more input surfaces to provide an output surface, and to also provide that generated output surface directly via an internal data path or paths to the other set of display processing circuits for use as an input surface for generating an output surface for display.

19. The method of claim 15, wherein the first and second sets of display processing circuits each generate respective halves of an output surface to be displayed.

20. A non-transitory computer readable storage medium storing computer software code which when executing on a processor performs a method of operating a display controller in a data processing system, the display controller comprising:

a first set of display processing circuits comprising a first input circuit operable to read at least one input surface, a first processing circuit operable to process one or more input surfaces to generate an output surface, wherein the first processing circuit comprises a first composition circuit, wherein the first composition circuit is operable to compose two or more surfaces to generate a composited surface when generating an output surface, and a first output circuit operable to provide an output surface for display to a first display;

a second set of display processing circuits comprising a second input circuit operable to read at least one input surface, a second processing circuit operable to process one or more input surfaces to generate an output surface, wherein the second processing circuit comprises a second composition circuit, wherein the second composition circuit is operable to compose two or more surfaces to generate a composited surface when generating an output surface, and a second output circuit operable to provide an output surface for display to a second display;

one or more internal data paths configured to pass pixel data of a surface between the first and second sets of display processing circuits, wherein the one or more internal data paths are configured to directly pass pixel data of a surface between the first and second composition circuits and between the first and second output circuits; and a control circuit configured to, in response to control signals received by the control circuit, selectively activate one or more of the first and second sets of display processing circuits to process one or more input surfaces to generate one or more output surfaces for display, and selectively control direct passing of pixel data between the first and second composition circuits and between the first and second output circuits by selectively activating the direct passing of pixel data via the one or more internal data paths and selectively controlling the direction in which pixel data is directly passed;

the method comprising:

the control circuit, in response to a control signal received by the control circuit, selectively activating one or more of the first and second sets of display processing circuits to process one or more input surfaces to generate one or more output surfaces for display;

the activated one or more of the first and second sets of display processing circuits processing one or more input surfaces to generate one or more output surfaces for display; and the control circuit selectively controlling direct passing of pixel data for use when generating the one or more output surfaces for display between the first and second composition circuits and between the first and second output circuits of the activated one or more of the first and second sets of display processing circuits.

\* \* \* \* \*